US009798194B2

(12) United States Patent
Kobayashi et al.

(10) Patent No.: US 9,798,194 B2
(45) Date of Patent: Oct. 24, 2017

(54) LIQUID CRYSTAL DISPLAY DEVICE

(71) Applicant: Japan Display Inc., Minato-ku (JP)

(72) Inventors: Junichi Kobayashi, Tokyo (JP); Ryo Yoshida, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 14/662,681

(22) Filed: Mar. 19, 2015

(65) Prior Publication Data
US 2015/0268504 A1 Sep. 24, 2015

(30) Foreign Application Priority Data
Mar. 20, 2014 (JP) ................................. 2014-058133

(51) Int. Cl.
G02F 1/1339 (2006.01)
G02F 1/1333 (2006.01)

(52) U.S. Cl.
CPC .............. *G02F 1/13394* (2013.01); *G02F 2001/13396* (2013.01); *G02F 2001/13398* (2013.01); *G02F 2001/133388* (2013.01)

(58) Field of Classification Search
CPC ............ G02F 1/13394; G02F 1/1339; G02F 1/13452; G02F 1/1345; G02F 1/13454; G02F 2001/133388; G02F 2001/13396; G02F 2001/13398; G02F 2001/13456; G02F 1/134363
USPC .................. 349/155–157, 149, 151
See application file for complete search history.

(56) References Cited

U.S. PATENT DOCUMENTS

| | | | | |
|---|---|---|---|---|
| 7,683,993 B2* | 3/2010 | Ishitani | ............... | G02F 1/1339 349/122 |
| 7,738,068 B2* | 6/2010 | Lee | ..................... | G02F 1/13394 349/155 |
| 8,045,074 B2* | 10/2011 | Tanahara | ......... | G02F 1/136213 349/141 |
| 8,310,609 B2* | 11/2012 | Yoshida | ............ | G02F 1/134363 349/106 |

(Continued)

FOREIGN PATENT DOCUMENTS

| | | |
|---|---|---|
| JP | 6-082815 A | 3/1994 |
| JP | 2007-304556 | 11/2007 |

(Continued)

OTHER PUBLICATIONS

Office Action dated Aug. 29, 2017, in Japanese Patent Application No. 2014-053133, filed Mar. 20, 2014, w/English-language Translation.

*Primary Examiner* — Angela Davison
(74) *Attorney, Agent, or Firm* — Oblon, McClelland, Maier & Neustadt, L.L.P.

(57) ABSTRACT

A liquid crystal display device includes a first substrate including a first insulating film, and a circumferential line, a second substrate includes a second insulating film, a first main spacer interposed between the first substrate and the second substrate within a peripheral area and positioned between the first insulating film and the second insulating film, the first main spacer having a first height, and a first sub-spacer interposed between the first substrate and the second substrate within the peripheral area and positioned between the circumferential line and the second insulating film, the first sub-spacer having a second height which is less than the first height.

9 Claims, 4 Drawing Sheets

(56) References Cited

U.S. PATENT DOCUMENTS

| | | | |
|---|---|---|---|
| 2007/0263162 A1 | 11/2007 | Kang et al. | |
| 2011/0007251 A1* | 1/2011 | Yamamoto | G02F 1/133514 |
| | | | 349/108 |
| 2011/0136274 A1 | 6/2011 | Kang et al. | |
| 2011/0266565 A1 | 11/2011 | Wang et al. | |
| 2013/0076717 A1* | 3/2013 | Oikawa | G09G 3/36 |
| | | | 345/211 |
| 2013/0088672 A1* | 4/2013 | Shin | G02F 1/133512 |
| | | | 349/110 |
| 2013/0308084 A1* | 11/2013 | Niwano | G02F 1/1339 |
| | | | 349/155 |

FOREIGN PATENT DOCUMENTS

| | | |
|---|---|---|
| JP | 2008-165171 A | 7/2008 |
| JP | 2009-265484 A | 11/2009 |
| JP | 2013-238729 A | 11/2013 |
| JP | 2014-038210 A | 2/2014 |
| JP | 2014-115373 | 6/2014 |

* cited by examiner

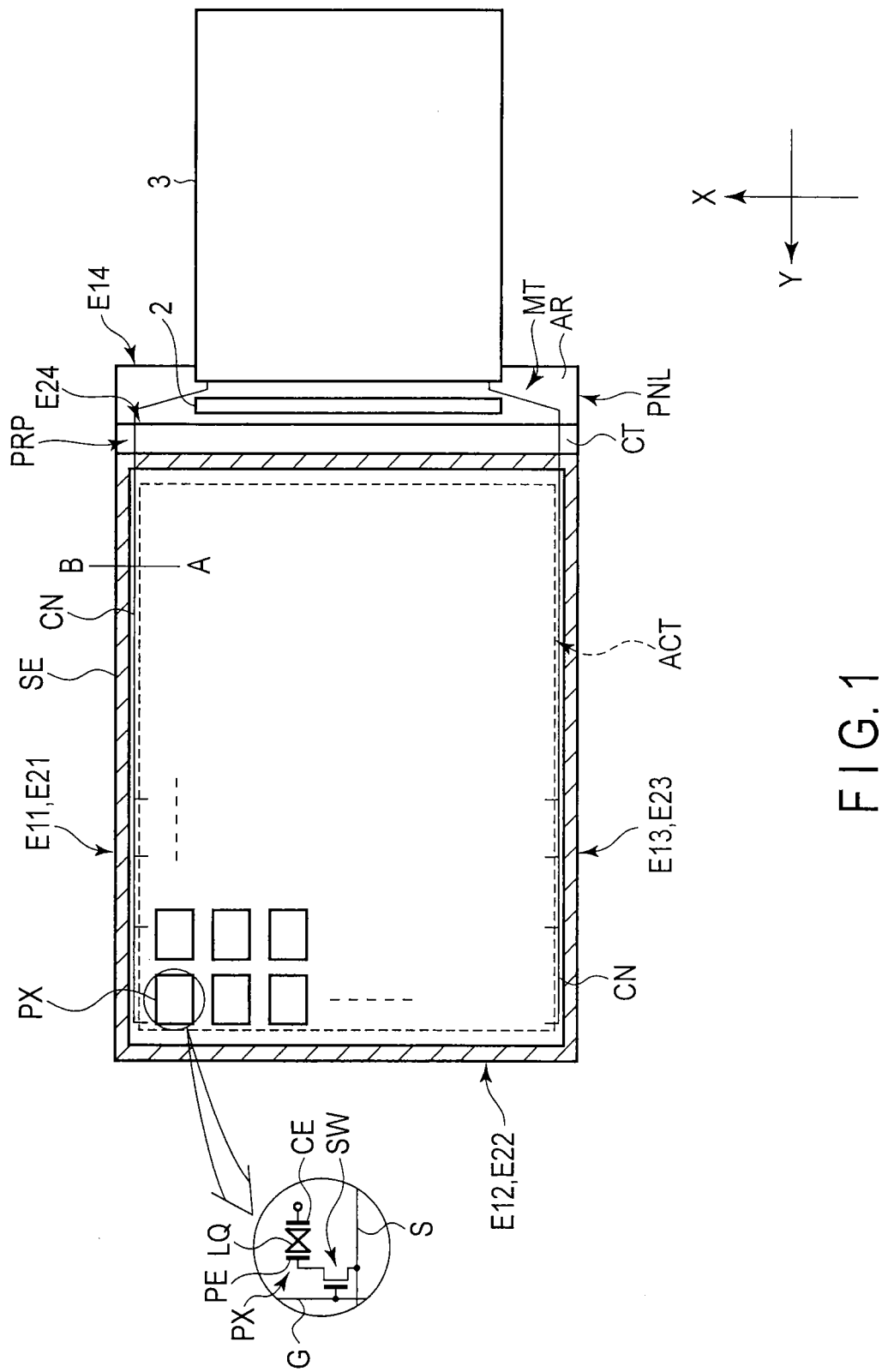
F I G. 1

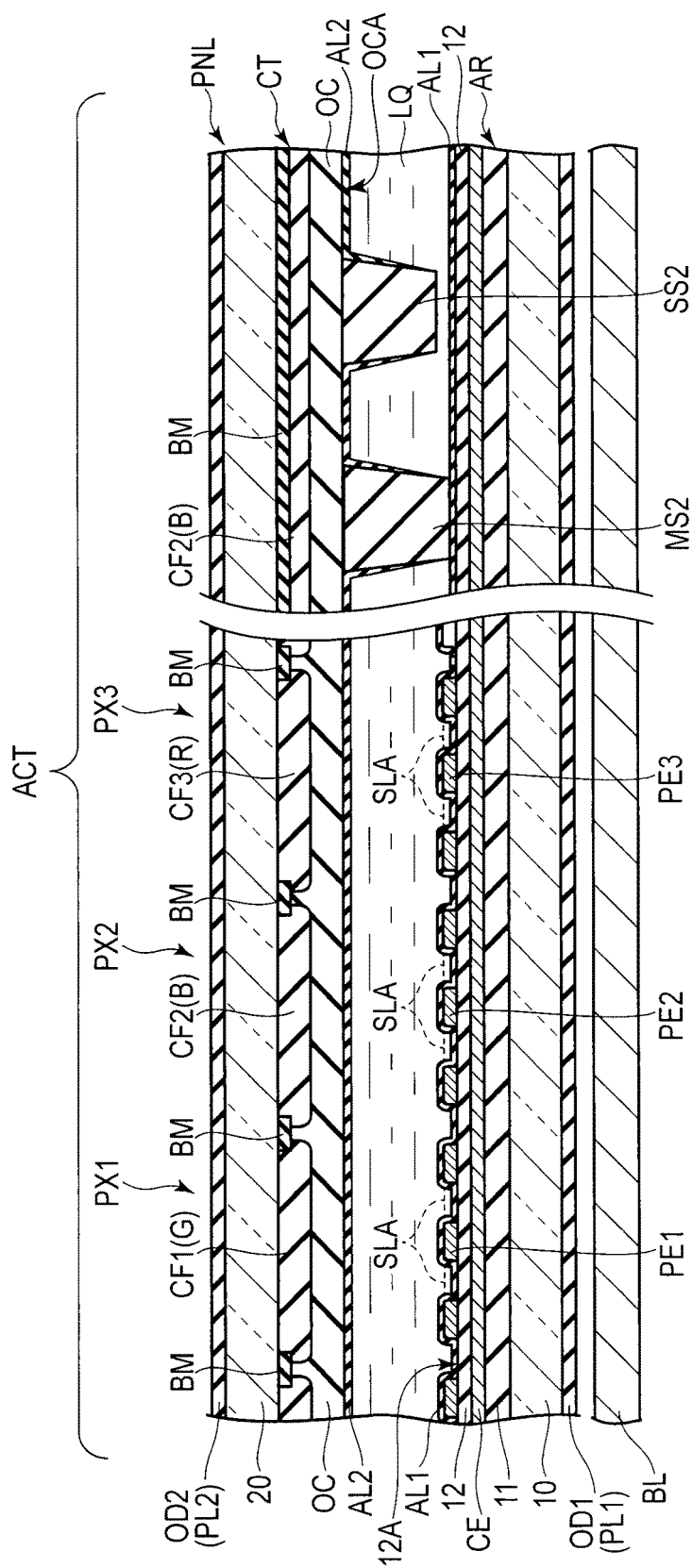
F I G. 2

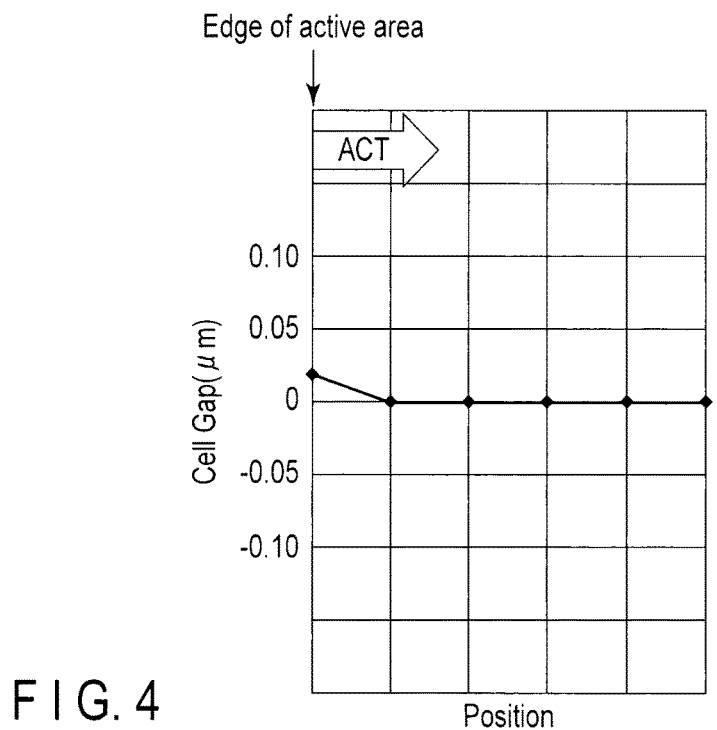
F I G. 4
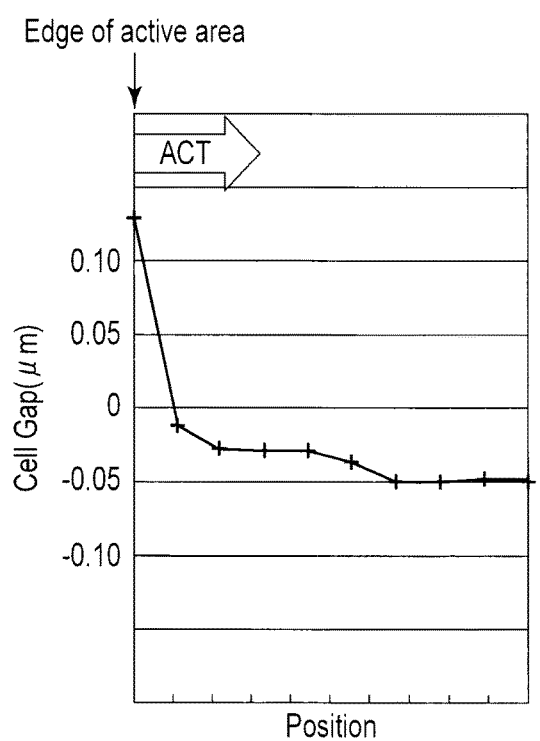
F I G. 5

LIQUID CRYSTAL DISPLAY DEVICE

CROSS-REFERENCE TO RELATED APPLICATIONS

This application is based upon and claims the benefit of priority from Japanese Patent Application No. 2014-058133, filed Mar. 20, 2014, the entire contents of which are incorporated herein by reference.

FIELD

Embodiments described herein relate generally to a liquid crystal display device.

BACKGROUND

Liquid crystal display devices are used in various technical fields. In such a device, it is important that the cell gap (the thickness of the liquid crystal layer between a pair of substrates) is uniform within an active area in which images are displayed. A gap spacer is used to form such a cell gap, and in recent years, a press buffer spacer is disposed in addition to the gap spacer to prevent a display quality failure due to external pressure.

In this liquid crystal display device, a structural difference occurs between the active area and the surrounding peripheral area, and because of this structural difference, the evenness of the substrate surface differs between the active area and the peripheral area. For example, the peripheral area includes driving lines necessary to drive pixels in the active area; in addition, there are various circumferential lines such as power lines to bypass the outer power, sensor signal lines electrically connected to sensor electrodes within the active area, and auxiliary lines electrically connected to metal lines used for the low-resistance process of various electrodes such as a transparent electrode.

In this structure, if a spacer having a similar height as the gap spacer disposed within the active area overlaps the outer periphery lines, the cell gap of the peripheral area becomes thicker than the cell gap of the active area. This causes the cell gap to locally thicken at the periphery of the active area, and consequently, the cell gap varies between the center and the periphery of the active area. This cell gap difference may be recognized by blurred display.

BRIEF DESCRIPTION OF THE DRAWINGS

FIG. 1 is a plan view which schematically shows an example of a display panel PNL applicable to a liquid crystal display device of an embodiment.

FIG. 2 is a cross-sectional view which schematically shows the structure of the active area ACT of the display panel PNL shown in FIG. 1.

FIG. 4 shows a measurement result of the cell gap in the active area of the display panel of the present embodiment.

FIG. 5 shows a measurement result of the cell gap in the active area of the display panel of the comparative example.

DETAILED DESCRIPTION

Figure 3:
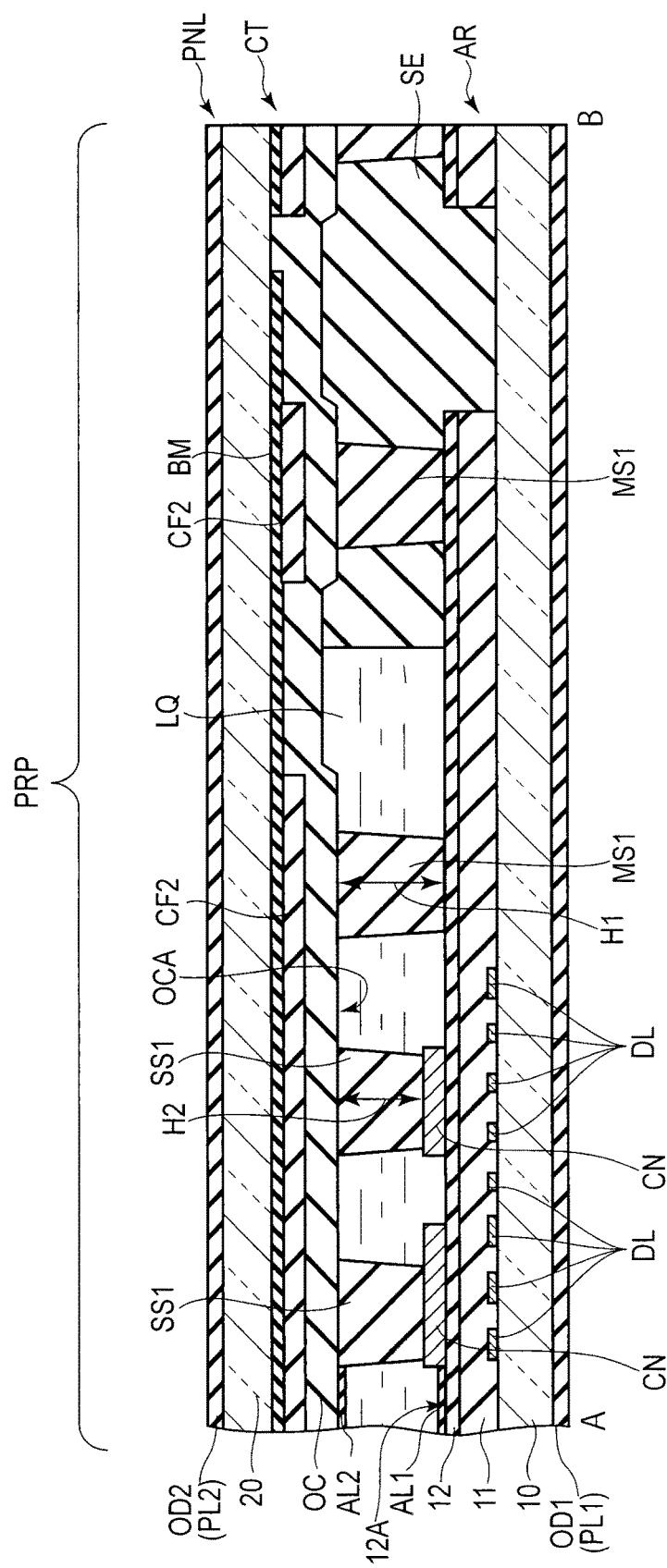
FIG. 3 is a cross-sectional view which schematically shows the structure of a peripheral area PRP taken along line A-B in the display panel PNL of FIG. 1.

In general, according to one embodiment, provided is a liquid crystal display device including: a first substrate comprising a first insulating film disposed in an active area configured to display an image, the first insulating film having a first surface extending in a peripheral area outside the active area, a pixel electrode formed on the first surface in the active area, and a circumferential line formed on the first surface in the peripheral area; a second substrate comprising a second insulating film having a second surface opposed to the first surface and extending in the active area and the peripheral area; a first main spacer interposed between the first substrate and the second substrate within the peripheral area and positioned between the first insulating film and the second insulating film, the first main spacer having a first height; a first sub-spacer interposed between the first substrate and the second substrate within the peripheral area and positioned between the circumferential line and the second insulating film, the first sub-spacer having a second height which is less than the first height; and a liquid crystal layer held between the first substrate and the second substrate.

Hereinafter, embodiments are explained with reference to the accompanying drawings. Note that structural elements having the same or similar functions in the figures are referred to by the same reference numbers and explanations considered redundant are omitted.

FIG. 1 is a plan view which schematically shows an example of a display panel PNL applicable to a liquid crystal display device of an embodiment.

A display panel PNL is an active matrix liquid crystal display panel including an array substrate AR, counter-substrate CT opposed to the array substrate AR, and a liquid crystal layer LQ held between the array substrate AR and the counter-substrate CT. The array substrate AR and the counter-substrate CT are adhered by a sealant SE while a predetermined cell gap is formed therebetween. In the Figure, the sealant SE is shaped in a rectangular frame-like closed loop; however, the shape is not limited thereto. The cell gap is defined by a columnar spacer (described later) formed on the array substrate or the counter-substrate CT. The display panel PNL includes an active area ACT for image display inside the area surrounded by the sealant SE. The active area ACT is shaped in, for example, substantially a rectangular and is composed of a plurality of pixels PX arranged in a matrix.

The array substrate AR includes a gate line G extending in a first direction X, a source line S extending in a second direction Y crossing the first direction X of the gate line G, a switching element SW electrically connected to the gate line G and the source line S, and a pixel electrode PE electrically connected to the switching element SW. A common electrode CE is provided with, for example, the counter-substrate CT, or it may be provided with the array substrate AR.

The detailed structure of the display panel PNL is not explained here but note that, if the display panel PNL is in a vertical field mode in which a vertical field along the normal to the substrate main surface (X-Y plane) is used, such as twisted nematic (TN) mode, optically compensated bend (OCB) mode, and vertically aligned (VA) mode, or in a tilted field mode in which a field is tilted with respect to the substrate surface, the pixel electrode PE is provided with the array substrate AR while the common electrode CE is provided with the counter-substrate CT. On the other hand, if the display panel PNL is in a mode in which a transverse field is mainly used such as in-plane switching (IPS) mode and fringe field switching (FFS) mode, both the pixel electrode PE and the common electrode CE are provided with the array substrate AR. Furthermore, the display panel PNL may be structured to correspond to a display mode composed of an arbitrary combination of the above vertical, transverse, and tilted fields.

In the example depicted, the display panel PNL is a quadrangle, and the array substrate AR and counter-substrate CT are quadrangles as well. The array substrate AR includes substrate ends E11 to E14 and the counter-substrate CT includes substrate ends E21 to E24. Substrate end E11 overlaps substrate end E21, substrate end E12 overlaps substrate end E22, substrate end E13 overlaps substrate end E23, and substrate end E14 is disposed outside substrate end E24. That is, the array substrate AR extends beyond substrate end E24 of the counter-substrate CT, and includes a mount MT between substrate end E14 and substrate end E24. Substrate end E11 and substrate end E21 are opposed to substrate end E13 and substrate end E23 with the active area ACT interposed therebetween. Substrate end E12 and substrate end E22 are opposed to the mount MT with the active area ACT interposed therebetween.

Signal suppliers such as driving IC chip 2 and flexible printed circuit (FPC) board 3 which supply signals necessary to drive the display panel PNL are positioned in a peripheral area PRP outside the active are ACT. In the example depicted, the signal suppliers such as driving IC chip 2 and FPC board 3 are mounted on the mount MT. The peripheral area PRP surrounds the active area ACT and is formed in a rectangular frame including an area in which the sealant SE is disposed.

In the display panel PNL depicted, the sealant SE extends to three sides excluding the side where the mount MT is. That is, the sealant SE extends to the position where substrate ends E11 and E21 overlap with each other, the position where substrate ends E12 and E22 overlap with each other, and the position where substrate ends E13 and E23 overlap with each other. Furthermore, the sealant SE is formed along the substrate end E24 at the position where the array substrate AR and counter-substrate CT are opposed to each other along the mount MT. The sealant SE is formed of a photosensitive resin material such as ultraviolet curing resin.

The array substrate AR further includes circumferential lines CN formed on the peripheral area PRP. The circumferential lines CN are connected to the signal suppliers (the FPC board 3 in the example depicted) on the mount MT, and extend from the mount MT to the peripheral area PRP along substrate end E11 and substrate end E13. In the example depicted, the circumferential line CN is not disposed in the peripheral area PRP along substrate end 12. The circumferential lines include, for example, a power line used for the bypass of external power, a sensor signal line electrically connected to a sensor electrode within the active area, and auxiliary line electrically connected to a metal line used to impart low resistance to various electrodes such as transparent electrodes. The circumferential lines CN are formed of an interconnect material used for the gate line G, source line S, and the like, namely, metals such as aluminum (Al), titanium (Ti), molybdenum (Mo), tungsten (W), and silver (Ag).

FIG. 2 is a cross-sectional view which schematically shows the structure of active area ACT of the display panel PNL shown in FIG. 1. Note that, in the cross-sectional structure depicted, a transverse mode is applied to the display panel PNL.

The array substrate AR includes a transparent first insulating substrate 10 such as a glass substrate and resin substrate. The array substrate AR includes a common electrode CE, pixel electrodes PE1 to PE3, first insulating film 11, second insulating film 12, and first alignment film AL1, and they are disposed on the first insulating substrate 10 at the side opposed to the counter-substrate CT.

The common electrode CE is formed on the first insulating film 11 and extends over pixels PX1 to PX3. The common electrode CE is formed of, for example, a transparent conductive material such as indium tin oxide (ITO) and indium zinc oxide (IZO). The common electrode CE is covered with the second insulating film 12. Note that, although they are not depicted, the gate line, source line, and switching element are formed between the first insulating substrate 10 and the first insulating film 11. The first insulating film 11 is, for example, a transparent organic insulating film of which surface is substantially flattened. The second insulating film 12 is, for example, a transparent inorganic insulating film having a surface (first surface) 12A which faces the counter-substrate.

Pixel electrode PE1 of pixel PX1, pixel electrode PE2 of pixel PX2, and pixel electrode PE3 of pixel PX3 are formed on the surface 12A of the second insulating film 12 to be opposed to the common electrode CE. A slit SLA is formed in each of pixel electrodes PE1 to PE3 to be opposed to the common electrode CE. Pixel electrodes PE1 to PE3 are formed of a transparent conductive material such as ITO and IZO. Pixel electrodes PE1 to PE3 are covered with the first alignment film AL1. The first alignment film AL1 covers the surface 12A of the second insulating film 12. The first alignment film AL1 is formed of a material indicative of horizontal orientation and is disposed on the array substrate AR at the surface contacting the liquid crystal layer LQ.

On the other hand, the counter-substrate CT is formed of a transparent second insulating substrate 20 such as a glass substrate and a resin substrate. The counter-substrate CT includes a light shielding layer (black matrix) BM, color filters CF1 to CF3, overcoat layer OC, and second alignment film AL2, and they are formed on the second insulating substrate 20 at the side opposed to the array substrate AR.

The light shielding layer BM is formed on the inner surface of the second insulating substrate 20. The light shielding layer BM is formed of a black resin material or a light-shielding metal. Color filters CF1 to CF3 are formed on the inner surface of the second insulating substrate 20 and partly overlap the light shielding layer BM. Color filter CF1 is a green (G) filter formed of a green resin material. Color filter CF2 is a blue (B) filter formed of a blue resin material. Color filter CF3 is a red (R) filter formed of a red resin material.

The overcoat layer OC covers color filters CF1 to CF3. The overcoat layer OC flattens the asperity on the surface of color filters CF1 to CF3. The overcoat layer OC is an organic insulating film formed of a transparent organic material. The overcoat layer OC is covered with the second alignment film AL2. The second alignment film AL2 is formed of a material indicative of horizontal orientation and is disposed on the counter-substrate CT at the surface contacting the liquid crystal layer LQ.

The array substrate AR and the counter-substrate CT described above are arranged such that the first alignment film AL1 and the second alignment film AL2 face each other.

The display panel PNL further includes a main spacer (second main spacer) MS2 and a sub-spacer (second sub-spacer) SS2 which are disposed on the active area ACT. Main spacer MS2 and sub-spacer SS2 are shaped in a pillar, respectively and are provided between the array substrate AR and the counter-substrate CT. In the example depicted, each of main spacer MS2 and sub-spacer SS2 is formed on the counter-substrate CT not to overlap any of pixel electrodes PE1 to PE3. Specifically, main spacer MS2 and sub-spacer SS2 are formed in the overcoat layer OC at its surface (second surface) OCA which faces the array substrate AR and are tapered toward the array substrate AR.

Main spacer MS2 and sub-spacer SS2 have different heights, and main spacer MS2 is higher than sub-spacer SS2. Main spacer MS2 and sub-spacer SS2 are formed of a resin material. Main spacer MS2 and sub-spacer SS2 can be formed together through, for example, a photolithography process in which an applied resin material is exposed and developed through a halftone mask of which transmissivity varies locally.

Main spacer MS2 contacts the array substrate AR and sub-spacer SS2 is apart from the array substrate AR. That is, main spacer MS2 is provided between the second insulating film 12 and the overcoat layer OC with its tip contacting the first alignment film AL1. Furthermore, sub-spacer SS2 is provided between the second insulating film 12 and the overcoat layer OC as well while the liquid crystal layer LQ is interposed between its tip and the first alignment film AL1. Note that, for the sake of simpler depiction, main spacer MS2 and sub-spacer SS2 are shown as being adjacent to each other; however, the layout thereof is not limited to this depiction. Main spacers MS2 and sub-spacers SS2 may be dispersed within the active area ACT with a predetermined density. The tips of main spacer MS2 and sub-spacer SS2 may be covered with the second alignment film AL2, respectively.

Main spacer MS2 is interposed between the array substrate AR and the counter-substrate CT to form a predetermined cell gap therebetween. Here, referring to the exterior of the display panel PNL, the array substrate AR and the counter-substrate CT are substantially parallel within the active area ACT.

The array substrate AR and the counter-substrate CT are adhered to each other by a sealant with a cell gap formed therebetween. The liquid crystal layer LQ is composed of liquid crystal compositions including liquid crystal molecules LM sealed in the cell gap formed between the first alignment film AL1 of the array substrate AR and the second alignment film AL2 of the counter-substrate CT.

A backlight BL is disposed at the rear surface side of the display panel PNL structured as above. As the backlight BL, various forms can be adopted and details thereof are omitted.

On the outer surface of the array substrate AR, that is, on the outer surface of the first insulating substrate 10, a first optical device OD1 including a first polarizer PL1 is provided. On the outer surface of the counter-substrate CT, that is, on the outer surface of the second insulating substrate 20, a second optical device OD2 including a second polarizer PL2 is provided. A first absorption axis of the first polarizer PL1 and a second absorption axis of the second polarizer PL2 are in a crossed-Nicol relationship.

FIG. 3 is a cross-sectional view which schematically shows the structure of the peripheral area PRP taken along line A-B in the display panel PNL of FIG. 1.

In the array substrate AR, the first insulating film 11 and the second insulating film 12 extend from the active area ACT to the peripheral area PRP shown in FIG. 2. Note that, in the example depicted, the first insulating film 11 and the second insulating film 12 have intermittence within the peripheral area PRP. The array substrate AR includes, in addition to the circumferential line CN, a drive line DL which is necessary for the pixel drive within the peripheral area PRP. The drive line DL is provided between the first insulating substrate 10 and the first insulating film 11, for example. To avoid the interference with the drive line DL, the circumferential line CN and the drive line DL are disposed on different layers, and in the example depicted, the circumferential line CN is formed on the surface 12A of the second insulating film 12.

The circumferential lines CN are disposed within a limited area of the peripheral area PRP at a high density without obstructing a narrower frame structure of the display panel PNL. Furthermore, the circumferential lines CN may sometimes be formed over a long range within the peripheral area PRP, and to meet this arrangement, the circumferential line CN is required to have a low resistance. If the line width of the circumferential line CN is increased to impart low resistance to the circumferential line CN, the peripheral area PRP must be increased as well, and it will be an obstruction for the narrower frame structure of the display panel PNL. Therefore, the thickness of the circumferential line CN should preferably be increased to reduce the resistance. For example, the thickness of the pixel electrode PE is approximately 0.05 µm, and the thickness of the circumferential line CN is approximately 0.2 to 0.3 µm which is greater than the pixel electrode PE.

In the counter-substrate CT, the light shielding layer BM extends from the active area ACT to the peripheral area PRP shown in FIG. 2. Note that, in the example depicted, the light shielding layer BM has intermittence within the peripheral area PRP. Furthermore, one of the color filters, that is, color filter CF2, for example, is disposed within the peripheral area PRP with intermittence in part. The overcoat layer OC extends from the active area ACT to the peripheral area PRP. The array substrate AR and the counter-substrate CT are adhered to each other by the sealant SE.

The display panel PNL further includes, within the periphery are PRP, a main spacer (first main spacer) MS1 and sub-spacer (first sub-spacer) SS1 interposed between the array substrate AR and the counter-substrate CT. Main spacer MS1 and sub-spacer SS1 are formed in a pillar, respectively. In the example depicted, main spacer MS1 and the sub-spacer SS1 are formed on the counter-substrate CT, respectively. Specifically, main spacer MS1 and sub-spacer SS1 are formed on the surface OCA of the overcoat layer OC and are tapered toward the array substrate AR.

Main spacer MS1 has a height H1 and contacts the array substrate AR. Sub-spacer SS1 has a height H2 which is lower than the height H1, and contacts the array substrate AR. That is, main spacer MS1 is provided between the second insulating film 12 and the overcoat layer OC and its tip contacts the second insulating film 12 (or the first alignment film which is omitted from the figure). Furthermore, the sub-spacer SS1 is disposed between the circumferential line CN and the overcoat layer OC, and its tip contacts the circumferential line CN (or the first alignment film which is omitted from the figure).

Note that the tips of main spacer MS1 and sub-spacer SS1 may be covered with the second alignment film AL2, respectively. The height H1 of main spacer MS1 and the height of main spacer MS2 in the active area ACT are equal. Furthermore, the height H2 of sub-spacer SS1 and the height of sub-spacer SS2 in the active area ACT are equal.

The resin material used for main spacer MS1 and sub-spacer SS1 is the same as that used for main spacer MS2 and sub-spacer SS2 in the active area ACT. Note that main spacer MS1 and sub-spacer SS1 can be formed in the same process used for main spacer MS2 and sub-spacer SS2.

In the peripheral area PRP as above, the circumferential line CN formed on the surface 12A of the second insulating film 12 creates a step on the array substrate AR at its surface opposed to the counter-substrate CT. Especially, if the thickness of the circumferential line CN is relatively great, a larger step is formed between the upper surface of the circumferential line CN and the surface 12A of the second insulating film 12. On the other hand, at the counter-substrate CT side, the surface OCA of the overcoat layer OC is formed relatively flat. Therefore, almost no step is formed on the counter-substrate CT at its surface opposed to the array substrate AR. That is, the gap between the circumferential line CN and the overcoat layer OC is less than the gap between the second insulating film 12 and the overcoat layer OC by the thickness of the circumferential line CN.

A difference between the height H1 of main spacer MS1 and the height H2 of sub-spacer SS1 is substantially equal to the thickness of the circumferential line CN. Therefore, within the area overlapping the circumferential line CN, sub-spacer SS1 contacts the array substrate AR to maintain the cell gap. Within the area not overlapping the circumferential line CN, that is, within the area where the second insulating film 12 and the overcoat layer OC are opposed to each other, main spacer MS1 contacts the array substrate AR to maintain the cell gap. Here, referring to the exterior of the display panel PNL, the array substrate AR and the counter-substrate CT are substantially parallel within the peripheral area PRP. Furthermore, the cell gap formed by main spacer MS2 in the active area ACT is still maintained by main spacer MS1 and sub-spacer SS1 within the peripheral area PRP, and thus, the array substrate AR and the counter-substrate CT are substantially parallel from the active area ACT to the peripheral area PRP.

As can be understood from the above, within the area extending along the substrate end E11 and the substrate end E21 in the peripheral area PRP, main spacer MS1 and sub-spacer SS1 are disposed in a mixed manner and the cell gap is maintained by both main spacer MS1 and sub-spacer SS1.

The circumferential lines CN are disposed at a high density within the peripheral area PRP, and thus, the number of sub-spacers SS1 overlapping the circumferential lines CN is greater than the number of main spacers MS1 not overlapping the circumferential lines CN. For example, as to the spacers within the peripheral area PRP, about 60% are sub-spacers SS1 and about 40% are main spacers MS1.

Such a structure is also applied to the area extending along the substrate end E13 and the substrate end E23 within the peripheral area PRP. On the other hand, in such a layout that the circumferential line CN is not disposed in the area extending along the substrate end E12 and the substrate end E22 in the peripheral area PRP, almost all the spacers disposed in the peripheral area PRP are main spacers MS1 and there is very a few sub-spacers SS1 disposed therein.

According to the present embodiment, within the peripheral area PRP structured as a narrow frame, there are disposed main spacers MS1 having the height H1 and the sub-spacers SS1 having the height H2 which is less than the height H1, and the cell gap is maintained by sub-spacer SS1 at the position overlapping the circumferential line CN while the cell gap is maintained by main spacer MS1 at the position not overlapping the circumferential line CN. Therefore, in the peripheral area PRP, the cell gap can be maintained as it is in the active area ACT without being affected by the steps formed by the circumferential lines CN. Consequently, the cell gap is formed substantially uniformly in the active area ACT at not only its central part but also its outer peripheral part which is close to the peripheral area PRP, and a display blur due to unevenness in the cell gap formation can be suppressed.

Furthermore, within the active area ACT, main spacers MS2 are interposed between the array substrate AR and the counter-substrate CT to form the cell gap, and in addition thereto, sub-spacers SS2 which are less than main spacers MS2 in height are disposed therebetween. Sub-spacers SS2 are to contact the array substrate AR in a case of external impact applied to a certain point on the substrate surface of the active area ACT as shock absorbers. Consequently, the low-temperature bubbles can be suppressed and resistance to compressive deformation due to external impact can be improved.

Moreover, main spacer MS2 and main spacer MS1 are substantially equal in height, and sub-spacer SS2 and sub-spacer SS1 are substantially equal in height, too, and they are all manufactured through the same process. Therefore, additional processes to form spacers of different heights individually are not necessary.

Now, as to the display panel PNL of the present embodiment, the cell gap in the active area was measured. Note that, as a comparative example, a display panel having a peripheral area PRP in which only main spacers MS1 are disposed in positions not to overlap circumferential lines CN and in positions not to overlap circumferential lines CN was prepared to measure the cell gap in the active area.

FIG. 4 shows a measurement result of the cell gap in the active area of the display panel of the present embodiment. FIG. 5 shows a measurement result of the cell gap in the active area of the display panel of the comparative example.

Note that the transverse axis in each figure indicates position from the edge of the active area (that is, a boundary between the active area and the peripheral area) to the center of the active area. The vertical axis in each figure indicates measured values of the cell gap where the target cell gap was set to zero. In the vertical axis, a positive value is higher than the target cell gap and a negative value is lower than the target cell gap.

As to the present embodiment, it was confirmed that the cell gap is substantially uniform from the edge to the center of the active area. A measured difference in the cell gap between the edge and the center of the active area was approximately 0.02 µm and this is significantly lower than a cell gap difference (approximately 0.1 µm or more) which is recognizable as a gap blur. As to the present embodiment, the active area was checked visually and no display blur was acknowledged in its entirety. Furthermore, as to the present embodiment, an impact force was applied to the active area under a low temperature environment by experiment and no bubble was generated in the active area.

In contrast, as to the comparative example, a measured difference exceeds the target cell gap by approximately 0.13 µm at the edge of the active area and this caused the cell gap become unstable at the center of the active area. As to the comparative example, the active area was checked visually and a display blur due to the gap blur was confirmed at the periphery part of the active area.

As explained above, according to the present embodiment, a liquid crystal display device of excellent display quality can be achieved.

In the above embodiment, an example of the display panel PNL in the transverse field mode has been described; however, the structure of the display panel PNL in this mode is not limited to the above example. For example, pixel electrodes PE1 to PE3 may be formed between the first insulating film 11 and the second insulating film 12, and the common electrode CE may be formed between the second insulating film 12 and the first alignment film AL1.

Furthermore, the present embodiment can be applied to display panels in different display modes. For example, in a display panel PNL in the vertical field mode such as VA mode, pixel electrodes PE and circumferential lines CN are formed on a first insulating film 11 which is an organic insulating film within an array substrate AR and a common electrode CE is formed on an overcoat layer OC within a counter-substrate CT. Therein, main spacers MS2 and sub-spacers SS2 are formed on the surface of the overcoat layer OC or on the surface of the common electrode CE within the active area ACT and a cell gap is formed by main spacers MS2 while sub-spacers SS2 are apart from the array substrate AR. Furthermore, main spacers MS1 and sub-spacers SS1 are formed on the surface of the overcoat layer OC or on the surface of the common electrode CE within the peripheral area PRP and a cell gap is maintained by main spacers MS1 at positions not overlapping the circumferential lines CN and by sub-spacers SS2 at positions overlapping the circumferential lines CN. The same advantage obtained by the above embodiment can be achieved in this display panel.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device, comprising:
    a first substrate comprising a first transparent electrode disposed in an active area configured to display an image, a first insulating film covering the first transparent electrode, the first insulating film having a first surface extending in a peripheral area outside the active area, a second transparent electrode formed directly on the first surface in the active area, and a circumferential line formed directly on the first surface in the peripheral area;
    a second substrate comprising a second insulating film having a second surface opposed to the first surface and extending in the active area and the peripheral area;
    a first main spacer interposed between the first substrate and the second substrate within the peripheral area and positioned between the first insulating film and the second insulating film, the first main spacer having a first height;
    a first sub-spacer interposed between the first substrate and the second substrate within the peripheral area and positioned between the circumferential line and the second insulating film, the first sub-spacer having a second height which is less than the first height; and
    a liquid crystal layer held between the first substrate and the second substrate,
    wherein the first surface faces the second substrate,
    the circumferential line is formed of a metal material which is different from materials of the first and second transparent electrodes,
    the first main spacer contacts the first insulating film, and the first sub-spacer contacts the circumferential line,
    wherein the first transparent electrode, the first insulating layer, and the second transparent electrode are stacked in this order from the first substrate toward the liquid crystal layer.

2. The liquid crystal display device of claim 1, wherein the first main spacer and the first sub-spacer are formed on the second surface, and a difference between the first height and the second height is substantially equal to a thickness of the circumferential line.

3. The liquid crystal display device of claim 2, further comprising:
    a second main spacer disposed within the active area, contacting the first substrate, and having a height substantially equal to that of the first main spacer; and
    a second sub-spacer disposed within the active area, apart from the first substrate, and having a height substantially equal to that of the first sub-spacer.

4. The liquid crystal display device of claim 3, wherein the first main spacer, the first sub-spacer, the second main spacer, and the second sub-spacer are formed of a same resin material.

5. The liquid crystal display device of claim 1, wherein the circumferential line has a thickness which is greater than that of the second transparent electrode.

6. The liquid crystal display device of claim 1, wherein the first substrate further comprises a mount on which a signal supplier is mounted, a first substrate end and a third substrate end which are opposed to each other with the active area interposed therebetween, and a second substrate end opposed to the mount with the active area interposed therebetween, and
    the circumferential line is disposed in the mount to extend in the peripheral area along both the first substrate end and the third substrate end.

7. The liquid crystal display device of claim 6, wherein the number of the first sub-spacers is greater than the number of the first main spacers in an area along the first substrate end and the third substrate end within the peripheral area.

8. The liquid crystal display device of claim 1, wherein the first transparent electrode is a common electrode, and the second transparent electrode is a pixel electrode.

9. The liquid crystal display device of claim 1, wherein the first substrate and the second substrate are adhered by a sealant in the peripheral area,
    the liquid crystal layer is located inside of the sealant, and
    the circumferential line overlaps the liquid crystal layer in the peripheral area.

* * * * *